United States Patent
Huzinec et al.

(10) Patent No.: US 8,206,473 B2
(45) Date of Patent: Jun. 26, 2012

(54) ABRASIVE COMPOSITION AND ARTICLE FORMED THEREFROM

(75) Inventors: Gary Michael Huzinec, Bloomingdale, NJ (US); William Francis Koval, Newton, NJ (US)

(73) Assignee: 3M Innovative Properties Company, St. Paul, MN (US)

( * ) Notice: Subject to any disclaimer, the term of this patent is extended or adjusted under 35 U.S.C. 154(b) by 367 days.

(21) Appl. No.: 12/530,699

(22) PCT Filed: Feb. 6, 2008

(86) PCT No.: PCT/US2008/053122
§ 371 (c)(1),
(2), (4) Date: Sep. 10, 2009

(87) PCT Pub. No.: WO2008/112357
PCT Pub. Date: Sep. 18, 2008

(65) Prior Publication Data
US 2010/0037531 A1    Feb. 18, 2010

(51) Int. Cl.
*B24D 3/14* (2006.01)
*B24D 3/34* (2006.01)
*B24D 18/00* (2006.01)

(52) U.S. Cl. ............... 51/293; 51/307; 51/308; 51/309

(58) Field of Classification Search .................. None
See application file for complete search history.

(56) References Cited

U.S. PATENT DOCUMENTS

| | | | |
|---|---|---|---|
| 2,977,206 A | | 3/1961 | Sheets |
| 4,907,376 A * | | 3/1990 | Bouchard et al. ............. 451/548 |
| 5,178,644 A | | 1/1993 | Huzinec |
| 6,123,744 A * | | 9/2000 | Huzinec ......................... 51/307 |
| 7,722,691 B2 * | | 5/2010 | Orlhac et al. .................. 51/309 |
| 2003/0194954 A1 * | | 10/2003 | Bonner et al. .................. 451/49 |
| 2004/0033766 A1 | | 2/2004 | Hokkirigawa et al. |

* cited by examiner

*Primary Examiner* — Jerry Lorengo
*Assistant Examiner* — Jared Wood
(74) *Attorney, Agent, or Firm* — Scott A. Baum

(57) ABSTRACT

An abrasive composition including vitreous binding material; abrasive material; and a dimensional stabilizing additive (DSA), present in an amount that is from about 1 to about 40 volume percent of the abrasive composition, wherein the dimensionally stabilizing additive is inert to the binding material, and has a Mohs hardness of between 4 and 9, and wherein the abrasive composition does not include hollow sphere fillers. Also included is a method of making an abrasive articles, articles formed thereby; and articles formed from the abrasive compositions.

18 Claims, No Drawings

ABRASIVE COMPOSITION AND ARTICLE FORMED THEREFROM

FIELD

This invention relates to abrasive articles, compositions utilized in making such articles, and methods of making such articles.

BACKGROUND

During the production of grinding wheels for example, the article is fired in order to melt some of the components and form the final article. This melting increases the strength of the article and disadvantageously causes the structure to be consolidated which results in shrinkage of the article. It is generally desirable to reduce grinding forces caused by a grinding wheel by having a more open structure which refers to a lower percentage of abrasive. However, a lower percentage of abrasive will further increase the consolidation of the structure during firing. This additional shrinkage reduces the volume of the abrasive article and thereby causes the percent of the abrasive in the final article to be much higher than in the "green" article, and therefore defeats the purpose of reducing the amount of abrasive. Therefore, methods of reducing shrinkage are constantly being sought.

Fugitive pore inducers, such as walnut shells, are widely used to encourage an open structure, but these have the effect of leaving a void behind after the fugitive pore inducer has burnt out or evaporated. This void is then partially collapsed during the sintering shrinkage. This partially defeats the purpose of including the pore inducer.

Providing a secondary abrasive in addition to the primary abrasive will reduce sintering shrinkage. However, this approach adds the disadvantage that the high hardness of the abrasive fillers will lead to increased grinding forces during use, as the secondary abrasive filler will not abrade away as would a softer filler. Therefore, this approach again defeats the purpose.

Therefore, there remains a need for methods of reducing shrinkage of sintered abrasive articles that do not add undesirable characteristics to the final article.

BRIEF SUMMARY

An abrasive composition that includes vitreous binding material abrasive material; and a dimensional stabilizing additive (DSA), present in an amount that is from about 1 to about 40 volume percent of the abrasive composition, wherein the dimensionally stabilizing additive is inert to the binding material, and has a Mohs hardness of between 4 and 9, and wherein the abrasive composition does not include hollow sphere fillers.

A method of forming an abrasive article that includes the steps of forming an abrasive composition that includes vitreous binding material; abrasive material; and a dimensional stabilizing additive (DSA), present in an amount that is from about 1 to about 40 volume percent of the abrasive composition, wherein the dimensionally stabilizing additive is inert to the vitreous binding material, and has a Mohs hardness of between 4 and 9, and wherein the abrasive composition does not include hollow sphere fillers; compacting the abrasive composition in a mold; and heating the compacted composition in order to fuse the vitreous binding material, abrasive material, and dimensional stabilizing additive to form an abrasive article, wherein the dimensional stabilizing additive is physically engulfed in the vitreous binding material.

An abrasive article formed by compacting a composition that includes vitreous binding material; abrasive material; and a dimensional stabilizing additive (DSA), wherein the abrasive composition does not include hollow sphere fillers, and wherein upon compaction and heating, the article decreases in volume by not more 10%.

DETAILED DESCRIPTION

It is to be understood that embodiments beyond what are mentioned here are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

An abrasive composition is disclosed herein. An abrasive composition comprises vitreous binding material, abrasive material, and a dimensional stabilizing additive (DSA). In one embodiment, the abrasive composition does not include hollow sphere fillers.

Abrasive compositions as disclosed herein include vitreous binding material. The vitreous binding material is the material that when heated forms the vitreous matrix of the abrasive article. The vitreous binding material also functions to bind the abrasive material together in an abrasive article. The vitreous binding material is also referred to in the art as the vitreous phase, vitreous bond, vitreous matrix, ceramic bond, or glass bond.

In one embodiment, the vitreous binding material can include any material or materials commonly used by one of skill in the art in forming vitreous abrasive articles. In one embodiment, the vitreous binding material can include glass particulate, glass precursor powders, or a combination thereof. In one embodiment, where a glass particulate is utilized as the vitreous binding material, the glass particulate is a finely ground particulate, a −200 or −325 mesh for example. In one embodiment where a glass precursor powder is utilized, feldspar, talc, borax, soda, metal oxides, and combinations thereof can be utilized.

In one embodiment, the vitreous binding material may be a mixture of oxides and silicates that upon heating to an elevated temperature react to for a glass matrix. The vitreous binding material may also include a frit which when heated to an elevated temperature melts and/or fuses to form the vitreous matrix of the abrasive article. Such frits can generally be made by preparing a combination of oxides and silicates that are heated to a high temperature to form a glass which is then cooled and broken into small particles. Such frits are widely commercially available, for example from Ferro Corporation (Cleveland, Ohio). In one embodiment, the size of the particles of the frit is related to the size of the abrasive particles. In another embodiment, the frit has an average particle size that is less than of the abrasive particles.

In one embodiment, a typical vitreous binding material contains about 70-90% $SiO_2+B_2O_3$, 1-20% alkali oxides, 1-20% alkaline earth oxides, and 1-20% transition metal oxides. In another embodiment, the vitreous binding material has a composition of about 82 wt % $SiO_2+B_2O_3$, 5% Alkali oxides, 5% Transition Series oxides, 4% $Al_2O_3$, and 4% Alkaline Earth oxides. In another embodiment, a frit having about 20% $B_2O_3$, 60% silica, 2% soda, and 4% magnesia is utilized as the vitreous binding material. One of skill in the art will understand that the particular components and the amounts of those components can be chosen in part to provide particular properties of the final abrasive article formed from the composition.

In one embodiment, the vitreous binding material is present in an amount from 10 to 40 volume percent of the abrasive composition. In another embodiment, the vitreous binding material is present in an amount from 15 to 35 volume percent of the abrasive composition. In yet another embodiment, the vitreous binding material is present in an amount from 18 to 26 volume percent of the abrasive composition.

Abrasive compositions as disclosed herein also include abrasive material. The abrasive material functions to give an abrasive article its abrasive nature. The abrasive material or materials that can be used in abrasive compositions as disclosed herein include those that are commonly known and utilized by those of skill in the art to manufacture abrasive articles.

In one embodiment, the abrasive material may include one or more of alumina, including fused alumina, sintered sol-gel alumina, sol-gel aluminum nitride/aluminum oxynitride, sintered bauxite; silicon carbide, alumina-zirconia, aluminoxynitride, ceria, boron suboxide, garnet, flint, diamond, including natural and synthetic diamond, and cubic boron nitride (cBN). In one embodiment, the abrasive material may include cubic boron nitride (cBN), diamond, alumina, silicon carbide, or a combination thereof. In one embodiment, the abrasive material is cubic boron nitride (cBN), diamond, or a combination thereof.

The size of the abrasive material or materials to be utilized may be dependent at least in part on the ultimate purpose of the abrasive article that is to be formed from the abrasive composition. In one embodiment, an abrasive material or materials having an average particle size between 2 micrometers (µm) and 1000 µm can be utilized. In another embodiment, an abrasive material or materials having an average particle size between 10 µm and 500 µm can be utilized. In yet another embodiment, an abrasive material or materials having an average particle size between 40 µm and 250 µm can be utilized. In one embodiment, abrasive materials of 60 to 325 mesh, U.S. Standard Sieve Sizes, can be utilized. In another embodiment, abrasive materials of 100 to 200 mesh size can be utilized. It will also be understood by one of skill in the art that different sizes of the same or different kinds of abrasive materials can be utilized in one abrasive composition.

The amount of abrasive material in the abrasive composition may be dependent at least in part on the ultimate purpose of the abrasive article that is to be formed from the abrasive composition. In one embodiment, an abrasive composition as disclosed herein may include from 10 to 55 volume percent abrasive material. In another embodiment, an abrasive composition as disclosed herein may include from 15 to 50 volume percent abrasive material. In yet another embodiment, an abrasive composition as disclosed herein may include from 25 to 45 volume percent abrasive material.

One of skill in the art will understand, having read this specification, that the desired level of porosity of an article formed using a composition as disclosed herein is dependent at least in part on both the size of the abrasive material and the amount of the abrasive material in the composition. As the amount of the abrasive material increases, the amount of porosity that can be achieved decreases.

An abrasive composition as disclosed herein also includes dimensional stabilizing additive (also referred to herein as "DSA"). The DSA functions to reduce shrinkage in an article made from an abrasive composition as disclosed herein. The DSA can function in reducing shrinkage while still producing an article capable of producing low grinding forces, i.e. an article with an open structure.

In one embodiment, the DSA is a material or a combination of materials that are inert to the vitreous binding material. By "physically inert to the vitreous binding material" it is meant that the DSA does not react chemically with the vitreous binding material, even when the vitreous binding material has been liquefied. In one embodiment, the DSA has a Mohs hardness of between 4 and 9. The Mohs scale of mineral hardness characterizes the scratch resistance of various minerals through the ability of a harder material to scratch a softer material. Materials that have a low strength, i.e. a Mohs hardness of below 4 cannot serve the same purpose as the DSA because the strength of a final article that included such fillers would be low. In one embodiment, the DSA is a relatively soft inorganic filler that has a hardness sufficient to retain the strength of a sintered abrasive article made from an abrasive composition as disclosed herein, but not so hard that the article causes high grinding force.

In one embodiment, the DSA is crushed firebrick. In one embodiment, the DSA is grog. Grog can refer to a number of materials, including fired clay. Grogs are commercially available from a number of sources including, but not limited to Maryland Refractories Company (Irondale, Ohio); and Christy Minerals (St. Louis, Mo.). Numerous grogs from Maryland Refractories are available, including, but not limited to, 95% silica grog, 90% alumina grog, and high duty grog. In one embodiment, a grog referred to as High Duty Grog from Maryland Refractories is utilized. Grogs are generally screened to have a known particle size. In one embodiment, grogs having a particle size from 10 µm to 200 µm are utilized. In another embodiment, grogs having a particle size from 30 µm to 200 µm are utilized. In yet another embodiment, grogs having a particle size from 45 µm to 150 µm are utilized.

In another embodiment, the DSA can be cerium oxide, andalusite, sillimanite, willemite, or a combination thereof. In embodiments where such materials are used, the particle size can be from 10 µm to 200 µm. In another embodiment, the particle size can be from 30 µm to 200 µm. In yet another embodiment, the particle size can be from 45 µm to 150 µm.

Abrasive compositions as disclosed herein generally include an amount of DSA that is sufficient to produce an article having an open structure that maintains a desired grinding force. In one embodiment, the amount of DSA is from 1 to 40 volume percent of the total abrasive composition. In another embodiment, the amount of DSA is from 2 to 30 volume percent of the total abrasive composition. In yet another embodiment, the amount of DSA is from 8 to 20 volume percent of the total abrasive composition.

Abrasive compositions as disclosed herein can also include components beyond the vitreous binding material, the abrasive material, and the DSA. It is generally known to those of skill in the art to utilize other components in order to assist in and/or improve the ease of making an article or to change the characteristics or performance of an article. Examples of such optional additives include, but are not limited to, lubricants, extreme pressure agents, waxes, grinding aids, such as kyanite, cryolite, and syenite for example, and temporary binders. Such additives can be added in amounts that are generally known to one of skill in the art.

In one embodiment, a temporary binder is added to the abrasive composition. Temporary binders function to bind together the components of the abrasive composition sufficiently so that the formed article is self-supporting before it is fired. The temporary binder may be an inorganic or an organic material or a combination thereof. In one embodiment, the temporary binder is an organic compound. Commonly used organic temporary binders include polymeric materials or polymer forming materials. Exemplary organic binders include, but are not limited to phenolic resins. It should also be noted that use of a temporary binder is less important or not necessary at all in instances where the article is to be fired in a mold, and it is not necessary that the pre-fired article (or green article) be able to maintain its shape on its own.

One embodiment of an abrasive composition as disclosed herein does not include hollow sphere fillers. Hollow sphere fillers are often used in order to maintain the reduced levels of porosity of an open structure. However, inclusion of hollow sphere fillers has the effect of weakening the final structure of the article due to the inherent weakness of a hollow sphere. Furthermore, some hollow sphere fillers are not inert to the vitreous binding material and cause the abrasive article to swell during sintering, as a result of gaseous species that are evolved as a result of reaction between the spheres and liquefied vitreous binding material. While this would result in an open structure, the strength of the structure is generally low which makes consistent production of an article with repeatable density difficult.

In embodiments where an abrasive composition will ultimately form a grinding wheel for example, the selection and amount of vitreous binding material, abrasive material, and DSA is generally chosen to maximize the number of parts produced by the grinding wheel while minimizing the grinding forces produced during the material removal process. "Opening the structure" of the grinding wheel refers to a reduction in the total volume percent of abrasive; in principle, this results in a reduction in grinding forces due to having few cutting points and less bonding material to rub against the workpiece material. In practice, however during sintering, reducing the volume percentage of solid (i.e. abrasive) will result in more shrinkage, since it is the interaction of the solid phases during sintering that inhibits consolidation. This additional shrinkage reduces the volume of the abrasive article and causes the percent of abrasive in the "fired" product to be much higher than in the "green" state, thus defeating the purpose of reducing the amount of abrasive.

It has been found that adding an appropriate crushed refractory ceramic, for example, into the vitrified composition can dramatically reduce the sintering shrinkage, enabling a strong abrasive article to be produced with usefully low abrasive content. Such an article grinds with low grinding forces, making it attractive to users where high grinding forces cannot be tolerated, such as in internal grinding, or in the grinding of highly work-hardening materials such as superalloys and stainless steels.

Abrasive compositions as disclosed herein can be utilized to form an abrasive article. Such a method includes the steps of forming an abrasive composition. Forming an abrasive composition may generally utilize conventional blending techniques, conditions and equipment known to those of skill in the art. The vitreous binding material, abrasive material, DSA, and any optional additives may be combined in any order to produce the composition. In one embodiment, the abrasive material can be combined with the DSA, and those two components can then be blended with the vitreous binding material followed by the addition of any optional materials that are to be added to the composition such as the temporary binder. In some embodiments, it can be advantageous to add the temporary binder (if one is to be used) last, especially if the temporary binder that is being used is volatile.

Once the abrasive composition has been formed, it is then compacted in a mold. In one embodiment, a measured amount of the abrasive composition is placed in a mold that defines the desired shape and overall size of an abrasive article. The mold type, and shape is well within the level of one of skill in the art. The composition is then compacted within the mold. Once compacted, the article is referred to as a "green" article or "pre-fired" article.

The step of heating causes the vitreous binding material, the abrasive material, and the DSA to form an abrasive article wherein the DSA is physically engulfed in the vitreous binding material. By "physically engulfed in the vitreous binding material" it is meant that the DSA is substantially encapsulated in the vitreous binding material, not housed in the voids of the vitreous binding material. During the heating step, the vitreous binding material is melted, this melting of the vitreous binding material increases the strength of the ultimate abrasive article by making the vitreous phase essentially continuous and thus able to bond the abrasive particles into the required shape and structure. It is during this heating step that the melting of the vitreous binding material causes a consolidation of the product thereby further reducing its as-pressed "green" volume. This consolidation is the result of eliminating the voids between the vitreous binding material and is driven thermodynamically by the reduction in surface area as the particles coalesce under the surface tension forces of the liquid material, or alternatively by the simultaneous use of pressure.

In some embodiments, the steps of compacting and heating can be carried out simultaneously or at least somewhat simultaneously. In other embodiments, the compacting step is carried out before the heating step. In some embodiments, the compacted composition can be removed from the mold before the step of heating is carried out.

In one embodiment, the heating step can be carried out in more than one stage, for example, an initial stage of heating, where the temperature is less than necessary to melt the vitreous binding material; and a later stage of heating where the temperature is high enough to melt the vitreous binding material. In some embodiments, the initial heating stage can be from 390° F. to 570° F. Such an initial heating stage can be useful to bind the components of the composition sufficiently to produce a self-supporting but unfired article, referred to herein as a green article. The later stage of heating, or the heating if it is not staged heating can generally be carried out from 1000° F. to 2000° F. In another embodiment, the later stage of heating, or the heating, if it is not staged heating, can generally be carried out at 1300° F. to 1800° F.

Abrasive compositions can be formed into abrasive articles using methods known to those of skill in the art, including the methods discussed above. Articles that are so formed are generally vitreous abrasive articles, and can be used in a number of applications, including but not limited to grinding wheels, and hones.

In one embodiment an article that is formed from a composition as disclosed herein decreases in volume by less than or equal to 10% after compaction and heating. In another embodiment, an article that is formed from a composition as disclosed herein decreases in volume by less than or equal to 8% after compaction and heating. In yet another embodiment, an article that is formed from a composition as disclosed herein decreases in volume by less than or equal to 4% after compaction and heating.

EXAMPLES

The disclosure will now be further added to with reference to the following examples. These examples demonstrate various specific embodiments and are not intended to limit the scope of this disclosure.

A series of modulus of rupture (MOR) test bars were produced with the compositions provided below. The compositions were prepared by mixing the abrasive material with the DSA (if present) in the specified amounts. The abrasive materials used were 80/100 US mesh and 325/400 US mesh sized cubic boron nitride (cBN) abrasive. The DSA material was High Duty Grog from Maryland Refractories (Irondale, Ohio). To the resulting mixture, the vitreous binding material, a −200 mesh size borosilicate glass of 20% $B_2O_3$, 60% silica, 2% soda and 4 percent magnesia (obtained from Ferro Corporation (Cleveland, Ohio)) was added. Comparative examples E and F included hollow glass microspheres, specifically Zeospheres® hollow glass microspheres from 3M®.

TABLE 1

| Example # | Volume % of 80/100 cBN | Volume % of 325/400 cBN | Volume % of Frit | Volume % of −120/+200 High Duty Grog | Volume % of −200 Grog | Volume % Zeospheres ® (−200/+325) |
|---|---|---|---|---|---|---|
| 1 | 37.5 | 0 | 20 | 8.75 | 0 | 0 |
| 2 | 37.5 | 0 | 20 | 15.0 | 0 | 0 |
| Comparative A | 50 | 0 | 20 | 0 | 0 | 0 |
| Comparative B | 43.75 | 0 | 20 | 0 | 0 | 0 |
| Comparative C | 37.5 | 0 | 20 | 0 | 0 | 0 |
| Comparative D | 25 | 0 | 20 | 0 | 0 | 0 |
| Comparative E | 37.5 | 0 | 20 | 0 | 0 | 8.75 |
| Comparative F | 37.5 | 0 | 20 | 0 | 0 | 15.0 |
| 3 | 0 | 37.5 | 20 | 8.75 | 0 | 0 |
| 4 | 0 | 37.5 | 20 | 0 | 8.75 | 0 |
| Comparative G | 0 | 50 | 20 | 0 | 0 | 0 |
| Comparative H | 0 | 43.75 | 20 | 0 | 0 | 0 |
| Comparative I | 0 | 37.5 | 20 | 0 | 0 | 0 |
| Comparative J | 0 | 25 | 20 | 0 | 0 | 0 |

The resulting compositions were then measured into molds. The 1.5×0.375×0.200" test bars were compacted in a hydraulic press at 370 MPa for 5 seconds and sintered in flowing air at 870° C. The before ("green") and after sintering ("fired") dimensions were recorded and the volume percent shrinkage computed. The MOR of each composition was then measured in 3-point bending using a Chatillon mechanical testing machine. Table 2 below shows the shrinkage date from these examples.

TABLE 2

| Example | Volume % change after firing | Volume % abrasive before firing | Volume % abrasive after firing | Modulus of Rupture (psi) |
|---|---|---|---|---|
| 1 | −7.4 | 37.5 | 40.5 | 5442 |
| 2 | −2.0 | 37.5 | 38.3 | 5309 |
| Comparative A | −2.8 | 50 | 51.4 | 7137 |
| Comparative B | −8.8 | 43.75 | 48.0 | 6185 |
| Comparative C | −16.7 | 37.5 | 45.0 | 6621 |
| Comparative D | −27.0 | 25.0 | 34.3 | 4953 |
| 3 | −6.8 | 37.5 | 40.2 | 9124 |
| 4 | −6.2 | 37.5 | 40.0 | 9437 |
| Comparative E | +4.8 | 37.5 | 35.8 | 4499 |
| Comparative F | +21.3 | 37.5 | 30.9 | 3249 |
| Comparative G | −3.6 | 50 | 51.9 | 12471 |
| Comparative H | −5.8 | 43.75 | 46.4 | 9915 |
| Comparative I | −12.8 | 37.5 | 43.0 | 8814 |
| Comparative J | −36.0 | 25 | 39.1 | 10023 |

From the two tables it is clear that absent the DSA additive, sintering shrinkage gets very high as the percent abrasive is reduced, reaching 36 volume percent for a composition initially containing 25 vol % abrasive (Comparative Example J). The ceramic spheres reacted with the glass frit and caused them to swell by as much as 21% in volume (Comparative Example F). In the examples that utilized the coarse grit (80/100 mesh) abrasive, it can be seen that adding 15 vol % DSA reduced sintering shrinkage from 17 to 2 volume percent (Comparative Example C versus Example 2).

The practical effect of the reduced shrinkage can be seen in Table 2 where the results of the bulk sample shrinkage on the final volume percent abrasive are presented. For a sample initially of 37.5 volume percent abrasive prior to sintering, the effective volume percent of abrasive after firing went up to 45 percent in the absence of the DSA (Comparative Example C), yet only increased to 38.3 volume percent abrasive in the example that included a DSA (Example 2).

Table 2 also shows the effect of DSA addition on rupture strength, demonstrating that sufficient strength is retained when including a DSA. In fact with fine grit cBN the strength can actually go up, perhaps due to a dispersion strengthening mechanism (Compare examples 3 and 4 and Comparative Example I).

Thus, embodiments of abrasive compositions and articles formed thereby are disclosed. One skilled in the art will appreciate that the subject matter of this disclosure can be practiced with embodiments other than those disclosed. The disclosed embodiments are presented for purposes of illustration and not limitation, and this disclosure is limited only by the claims that follow.

What is claimed is:

1. An abrasive composition comprising:
vitreous binding material;
abrasive material; and
a dimensional stabilizing additive (DSA) comprising crushed firebrick, present in an amount that is from about 1 to about 40 volume percent of the abrasive composition,
wherein the dimensionally stabilizing additive is inert to the binding material, has a Mohs hardness of between 4 and 9, and
wherein the abrasive composition does not include hollow sphere fillers.

2. The composition according to claim 1, wherein the vitreous binding material is frit.

3. The composition according to claim 1, wherein the vitreous binding material is a glass precursor chosen from the group consisting of: feldspar, kaolin, borax, quartz, and combinations thereof.

4. The abrasive composition according to claim 1, wherein the vitreous binding material is present from about 10 to about 40 volume percent of the abrasive composition.

5. The abrasive composition according to claim 1, wherein the abrasive material is cubic boron nitride (cBN), diamond, alumina, silicon carbide, or a combination thereof 6. The abrasive composition according to claim 1, wherein the abrasive material has a particle size between 2 µm and 1000 µm.

7. The abrasive composition according to claim 1, wherein the abrasive material is present from about 10 to about 55 volume percent of the abrasive composition.

8. The abrasive composition according to claim 1, wherein the dimensional stabilizing additive is present from about 8 to about 20 volume percent of the abrasive composition.

9. The abrasive composition according to claim 1 further comprising a temporary binder.

10. An article formed from the composition according to claim 1.

11. A method of forming an abrasive article comprising the steps of:
a) forming an abrasive composition comprising:
i. vitreous binding material;
ii. abrasive material; and
iii. a dimensional stabilizing additive (DSA) comprising crushed firebrick, present in an amount that is from about 1 to about 40 volume percent of the abrasive composition,
wherein the dimensionally stabilizing additive is inert to the vitreous binding material, has a Mohs hardness of between 4 and 9, and
wherein the abrasive composition does not include hollow sphere fillers;
b) compacting the abrasive composition in a mold; and
c) heating the compacted composition in order to fuse the vitreous binding material, abrasive material, and dimensional stabilizing additive to form an abrasive article, wherein the dimensional stabilizing additive is physically engulfed in the vitreous binding material.

12. The method according to claim 11, wherein the step of compacting is carried out before the step of heating.

13. The method according to claim 12, wherein the mixture further comprises a temporary binder.

14. The method according to claim 11, wherein the step of compacting and the step of heating are carried out substantially simultaneously.

15. The method according to claim 11, wherein heating comprises firing the composition at a temperature of about 1300° F. to about 1800° F.

16. The method according to claim 11 further comprising removing the compacted composition from the mold before the step of heating.

17. An abrasive article formed according to the method of claim 11.

18. An abrasive article formed by compacting a composition comprising:
a) vitreous binding material;
b) abrasive material; and
c) a dimensional stabilizing additive (DSA) comprising crushed firebrick,
wherein the abrasive composition does not include hollow sphere fillers, and
wherein upon compaction and heating, the article decreases in volume by not more 10%.

* * * * *

UNITED STATES PATENT AND TRADEMARK OFFICE
CERTIFICATE OF CORRECTION

| | | |
|---|---|---|
| PATENT NO. | : 8,206,473 B2 | Page 1 of 1 |
| APPLICATION NO. | : 12/530699 | |
| DATED | : June 26, 2012 | |
| INVENTOR(S) | : Gary Michael Huzinec | |

It is certified that error appears in the above-identified patent and that said Letters Patent is hereby corrected as shown below:

On the Title Page, Column 1, under Section Heading "(65) Prior Publication Data)"
Line 3, insert -- This application is a 371 of PCT/US08/53122 02/06/2008
Which claims benefit of 60/894,486          03/13/2007 --.

Column 2
Line 6, delete "more 10%." and insert -- more than 10%. --, therefor.

Column 7
Line 32, delete "$B_2O_3$," and insert -- $B_2O_3$, --, therefor.

Column 9
Line 30, in Claim 5, after "thereof" insert -- . --.

Column 10
Line 43, in Claim 18, delete "more 10%." and insert -- more than 10%. --, therefor.

Signed and Sealed this
Fourth Day of September, 2012

David J. Kappos
*Director of the United States Patent and Trademark Office*